United States Patent Office 3,567,809
Patented Mar. 2, 1971

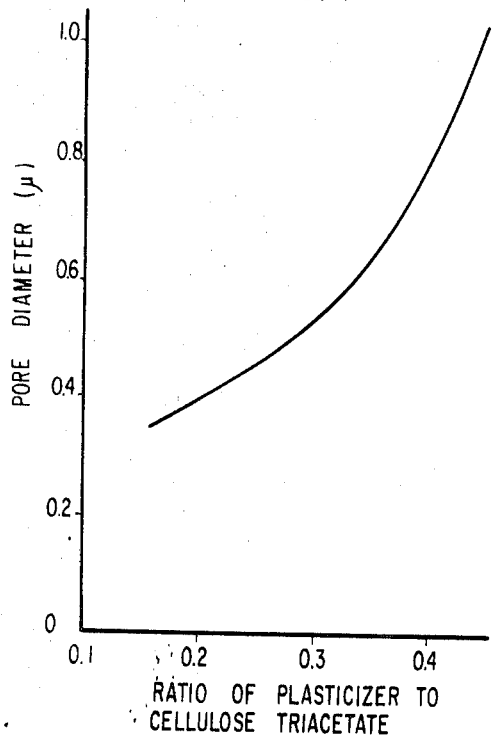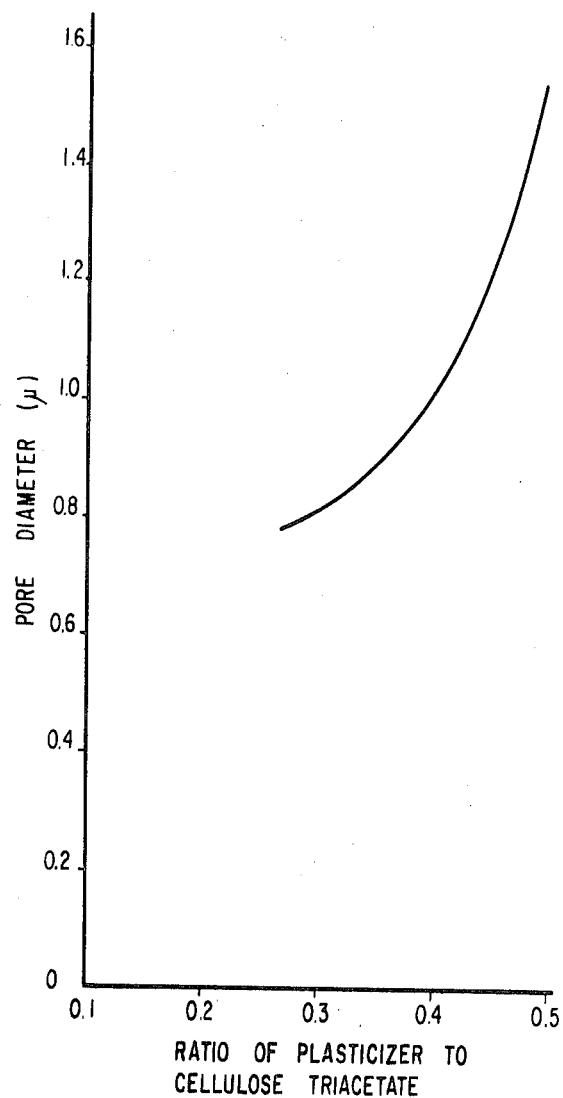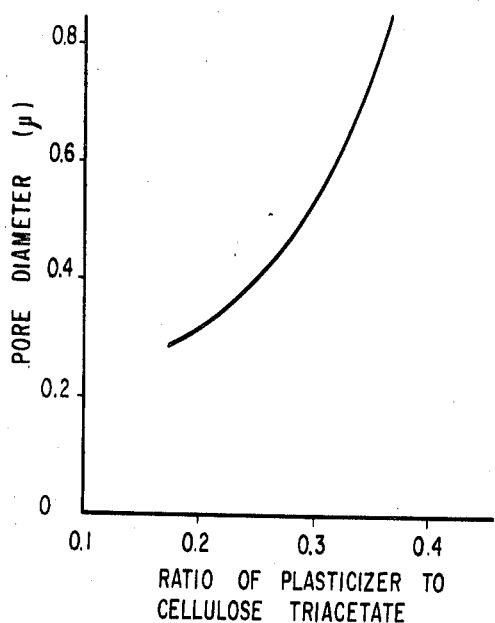

3,567,809
METHOD OF VARYING THE PORE DIAMETERS OF FINE PORES IN CELLULOSE ACETATE FILM
Wataru Ueno and Hideo Kawaguchi, Kanagawa, Japan, assignors to Fuji Shashin Film Kabushiki Kaisha, Kanagawa, Japan
Filed Oct. 6, 1967, Ser. No. 673,404
Claims priority, application Japan, Oct. 7, 1966, 41/66,097
Int. Cl. B29d 27/04; C08b 21/06, 27/42
U.S. Cl. 264—41
16 Claims

ABSTRACT OF THE DISCLOSURE

A method for varying the pore diameter of fine pores in a cellulose acetate film. The film is made by casting a solution containing two cellulose derivatives, each having an acetate linkage, a plasticizer and water, and drying in two stages, first at from 15° to 45° C., and secondly at from 80° to 120° C. Control of pore size is effected by varying type and amount of plasticizer which is a single or a mixture of glycerine derivative, glycol derivative and organic phosphate plasticizers.

BACKGROUND OF THE INVENTION

The present invention relates to a method of varying the pore diameter of fine pores in cellulose acetate film and, more particularly, it is concerned with a method of varying the pore diameters of fine pores in a porous cellulose acetate film for electrophoresis measurement, which is prepared by a known, previously disclosed method.

A filter of porous cellulose acetate film has been found suitable for filtering fine materials in gas or solution. For example, it is used in various fields for industry and investigation for the purpose of filtering dust from the air, sterilizing or filtering colloidal particles. Although the foregoing cellulose acetate film for electrophoresis measurement can be used for filtering relatively large dust particles and bacteria as a filter medium, it is not suitable for filtering smaller materials.

It is the principal object of the invention to obtain a fine porous film having various pore diameters by selecting properly the kind and quantity of additives and the drying conditions.

SUMMARY OF THE INVENTION

In accordance with the invention, there is provided a method of varying the pore diameter of fine pores in a cellulose acetate film, in making the porous cellulose acetate film by casting a solution containing two cellulose derivatives each having acetate linkage, a plasticizer and water and drying it firstly at 15° to 45° C., and then at 80° to 120° C., which is characterized by varying the variety and quantity of said plasticizer.

As the plasticizer to be mixed with the cellulose acetate there are used one or more of glycerine derivatives and organic phosphates. The glycerine derivatives are monoacetin, diacetin, triacetin and tributyrin. In addition, glycol derivatives may be used such as esters of diethylene glycol, triethylene glycol and polyethylene glycols ($n=1$ to 14 in the general formula: $HO\text{-}(CH_2\text{---}CH_2\text{---}O)_nH$ with mono-basic acids or polyesters of these glycols with dibasic acids. For example, ethylene glycol dipropionate, ethylene glycol butyrate, diethylene glycol diacetate, triethylene glycol diacetate, polyester of ethylene glycol with succinic acid, polyester of diethylene glycol with maleic acid and polyester of triethylene glycol with adipic acid are given, preferably these polyesters having a molecular weight of less than 1000. Illustrative of the organic phosphate are triphenyl phosphate, biphenyldiphenyl phosphate, tributyl phosphate and tricresyl phosphate.

DETAILED DESCRIPTION OF THE INVENTION

It is found by our investigation that a fragile film is obtained when the plasticizer is used in a proportion of less than 1%. The resulting film cannot be put to practical use, and it is necessary to select and use a suitable plasticizer according to the desired object, since the pore diameters of fine pores depends upon the variety and quantity of the plasticizer used. It is also found that the pore diameter decreases as the molecular weight of the plasticizer becomes large or as the plasticizer becomes hydrophobic, while the pore diameter increases with the increase of quantity of the plasticizer. The addition of water in a proportion of less than 1% in an organic solvent cannot give a uniform film, a preferable proportion ranging from 1% to 10%. The addition of water may be carried out at any time before casting the solution of cellulose acetate, but, in order to obtain a uniform mixture, water should be previously added to a solvent for cellulose acetate, in which cellulose acetate is then dissolved. As the solvent, the conventional ones used for the production of cellulose acetate films may be used. For example, one solvent or a mixture of solvents may be selected from acetone, methyl ethyl ketone, dioxane, methyl Cellosolve, methylene chloride, ethylene dichloride, diacetone alcohol, methanol, ethanol and propanol. As mixed solvents, acetone-ethanol (70:30), methyl ethyl ketone-methanol (80:20) and methylene chloride-methanol (70:30) are preferred.

As the cellulose acetate, a cellulose mixed ester, such as cellulose acetate butyrate or cellulose acetate propionate may be used as well as cellulose diacetate and cellulose triacetate. Although the mixing ratio of two or more cellulose derivatives can be optionally determined, for example, a mixing ratio of cellulose diacetate 90–10 and cellulose triacetate 10–90 is relatively preferred, and substantially equal amounts being most preferred.

During the step of drying, the initial drying temperature has such an influence upon the pore diameter of fine pores that the pore diameter decreases with the increase of the initial drying temperature and vice versa. In general, a temperature range of from 15° to 45° C., is desirable, since a film obtained under the initial drying condition of less than 15° C., is fragile, while at more than 45° C., the uniformity of the fine filter pores gets worse. The final drying is carried out by heating at 80° to 120° C.

Concentrations in the following examples are on the basis of parts by weight. The pore diameter of a fine pore is calculated from the quantity of water flowing out using the following relation:

$$R = K\sqrt{\frac{Q1}{ptA}}\,\epsilon$$

in which R=pore diameter of fine pore (micron), K=constant determined by the system; Q=quantity of water flowing out (g.); $1$=thickness of filter (cm.); $p$=pressure (g./cm.$^2$), $t$=flowing-out time (sec.); A=filtering area (cm.$^2$); and $\epsilon$=void ratio of filter defined by the formula, $$\text{void ratio }(\epsilon) = \frac{\text{volume of void}}{\text{volume of whole}}$$

The fine porous film of this invention may be used, e.g., as filters for various purposes and as porous films for electrophoresis or chromatograph.

The following examples are given in order to illustrate the invention without limiting the same.

Example 1

To 30 parts of cellulose triacetate (linked acetate: 60%) and 3 parts of cellulose diacetate (linked acetate: 55%) were added 60 parts of methylene chloride, 28 parts of ethanol, 2 parts of dibutyl phthalate and 4 parts of water. The resulting solution was cast on a glass sheet, dried firstly at 25° C., and, when the resulting film became white all over, it was stripped from the glass plate. It was then tensioned by a frame and dried at 100° C., for 1 hour. The thus obtained film had a void ratio of 80% and a pore diameter of 0.40 micron.

Example 2

To 3 parts of cellulose triacetate (linked acetate: 60%) and 3 parts of cellulose diacetate (linked acetate: 55%) were added 60 parts of methylene chloride, 28 parts of methanol, 2 parts of one of the plasticizers as shown in the following table and 4 parts of water. The resulting solution was flowed and spread on a glass sheet, dried firstly at 24° and 30° C., and then subjected to film making under the similar condition to that of Example 1 to investigate the influences of the initial drying temperature and plastiiczer on the pore diameters of fine pores. The following results were obtained.

| Plasticizer | Pore diameter | |
| --- | --- | --- |
| | 24° C. | 30° C. |
| Diacetin | 0.90–0.95 | 0.55–0.60 |
| Triacetin | 0.55–0.60 | 0.35–0.40 |
| Tributyrin | 0.40–0.50 | 0.20–0.25 |
| Polyester of diethylene glycol and succinic acid | 0.75–0.85 | 0.5–0.55 |
| Dimethyl phthalate | 0.5–0.6 | 0.3–0.4 |
| Dioctyl phthalate | 0.1 | |
| Polyethylene glycol 600 | 1.5 | |

Example 3

A solution of 4 parts of cellulose triacetate (linked acetate: 60%), 2 parts of cellulose diacetate (linked acetate: 55%), 59 parts of methylene chloride, 27 parts of methanol, 4 parts of water and variable amounts of triacetin was cast and subjected to film making at the initial drying temperature of 24° C. The relation between the pore diameters of fine pores in the resulting film and the content of the plasticizer, triacetin, is shown in FIG. 1, in which the content of triacetin of the abscissa is represented by a ratio to the sum of weight of cellulose diacetate and cellulose triacetate.

Example 4

A solution of 2.7 parts of cellulose triacetate (linked acetate: 60%), 2.7 parts of cellulose diacetate (linked acetate: 55%), 59 parts of methylene chloride, 28.2 parts of methanol, 2.7 parts of polyethylene glycol and 2.7 parts of water was cast and then subjected to film making at the initial drying temperature of 25° C. The resulting film had fine pores of 2.5 microns in diameter.

Example 5

A solution of 2.9 parts of cellulose triacetate (linked acetate: 60%), 2.9 parts of cellulose diacetate (linked acetate: 55%), 61.0 parts of methylene chloride, 28.7 parts of methanol and 4.5 parts of water was subjected to film making at the initial drying temperature of 27° C., while adding a plasticizer, triethylene glycol diacetate in variable amounts. The relation between the content of the plasticizer and pore diameter is shown in FIG. 2.

Example 6

A solution of 2.9 parts of cellulose triacetate (linked acetate: 60%), 2.9 parts of cellulose diacetate (linked acetate: 55%), 61.0 parts of methylene chloride, 28.7 parts of methanol and 4.5 parts of water was subjected to film making at the initial temperature of 30° C., while adding thereto a plasticizer, polyester of succinic acid and diethylene glycol in variable amounts. The relation between the content of the plasticizer and pore diameter is shown in FIG. 3.

What is claimed is:
1. In a method of preparing a porous cellulose acetate film by casing a solution containing a member selected from the group consisting of cellulose acetate butyrate, cellulose acetate propionate and a mixture of cellulose diacetate and cellulose triacetate, an organic solvent selected from the group consisting of acetone, methyl ethyl ketone, dioxane, methyl Cellosolve, methylene chloride, ethylene dichloride, diacetone alcohol, methanol, ethanol and propanol, and mixtures thereof, from one to ten wt. percent of water based upon the organic solvent, and a plasticizer selected from the group consisting of monoacetin, diacetin, triacetin, tributyrin, triphenyl phosphate, biphenyldiphenyl phosphate, tributyl phosphate, tricresyl phosphate and glycol esters selected from the group consisting of ethylene glycol dipropionate, ethylene glycol butyrate, diethylene glycol diacetate, triethylene glycol diacetate, polyester of ethylene glycol with succinic acid, polyester of diethylene glycol with maleic acid and polyester of triethylene glycol with adipic acid, with a member selected from the group consisting of a monobasic acid to provide a film, drying the film at a temperature of from 15° C. to 45° C. and drying further at a temperature of from 80° C. to 120° C., the improvement which comprises varying the pore diameters of the fine pores in the cellulose acetate film by varying the plasticizer employed in accordance with its molecular weight, the use of a plasticizer of larger molecular weight resulting in a corresponding decrease in pore diameter.

2. The method of claim 1 wherein said solution contains a mixture of cellulose diacetate and cellulose triacetate.

3. The method of claim 2 wherein said mixture is employed in a weight ratio of from 90:10 to 10:90.

4. The method of claim 2 wherein said mixture is employed in a weight ratio of substantially 1:1.

5. In a method of preparing a porous cellulose acetate film by casting a solution containing a member selected from the group consisting of cellulose acetate butyrate, cellulose acetate propionate and a mixture of cellulose diacetate and cellulose triacetate, an organic solvent selected from the group consisting of acetone, methyl ethyl ketone, dioxane, methyl Cellosolve, methylene chloride, ethylene dichloride, diacetone alcohol, methanol, ethanol and propanol, and mixtures thereof, from one to ten wt. percent of water based upon the organic solvent, and a plasticizer selected from the group consisting of monoacetin, diacetin, triacetin, tributyrin, triphenyl phosphate, biphenyldiphenyl phosphate, tributyl phosphate, tricresyl phosphate and glycol esters selected from the group consisting of ethylene glycol dipropionate, ethylene glycol butyrate, diethylene glycol diacetate, triethylene glycol diacetate, polyester of ethylene glycol with succinic acid, polyester of diethylene glycol with maleic acid and polyester of triethylene glycol with adipic acid, with a member selected from the group consisting of a monobasic acid and a dibasic acid to provide a film, drying the film at a temperature of from 15° C. to 45° C. and drying further at a temperature of from 80° C. to 120° C., the improvement which comprises varying the pore diameters of the fine pores in the cellulose acetate film by varying the plasticizer employed in accordance with its hydrophobicity, the use of a plasticizer of higher hydrophobicity resulting in a corresponding decrease in pore diameter.

6. The method of claim 5 wherein said solution contains a mixture of cellulose diacetate and cellulose triacetate.

7. The method of claim 6 wherein said mixture is employed in a weight ratio of from 90:10 to 10:90.

8. The method of claim 6 wherein said mixture is employed in a weight ratio of substantially 1:1.

9. In a method of preparing a porous cellulose acetate film by casting a solution containing a member selected from the group consisting of cellulose acetate butyrate, cellulose acetate propionate and a mixture of cellulose diacetate and cellulose triacetate, an organic solvent selected from the group consisting of acetone, methyl ethyl ketone, dioxane, methyl Cellosolve, methylene chloride, ethylene dichloride, diacetone alcohol, methanol, ethanol and propanol, and mixtures thereof, from one to ten wt. percent of water based upon the organic solvent, and a plasticizer selected from the group consisting of monoacetin, diacetin, triacetin, tributyrin, triphenyl phosphate, biphenyldiphenyl phosphate, tributyl phosphate, tricresyl phosphate and glycol esters selected from the group consisting of ethylene glycol dipropionate, ethylene glycol butyrate, diethylene glycol diacetate, triethylene glycol diacetate, polyester of ethylene glycol with succinic acid, polyester of diethylene glycol with maleic acid and polyester of triethylene glycol with adipic acid, with a member selected from the group consisting of a monobasic acid and a dibasic acid to provide a film, drying the film at a temperature of from 15° C. to 45° C. and drying further at a temperature of from 80° C. to 120° C., the improvement which comprises varying the amount of the plastcizer employed, a decrease in the amount of plasticizer employed resulting in a corresponding decrease in pore diameter.

10. The method of claim 9 wherein said solution contains a mixture of cellulose diacetate and cellulose triacetate.

11. The method of claim 10 wherein said mixture is employed in a weight ratio of from 90:10 to 10:90.

12. The method of claim 10 wherein said mixture is employed in a weight ratio of substantially 1:1.

13. In a method of preparing a porous cellulose acetate film by casting a solution containing a member selected from the group consisting of cellulose acetate butyrate, cellulose acetate propionate and a mixture of cellulose diacetate and cellulose triacetate, an organic solvent selected from the group consisting of acetone, methyl ethyl ketone, dioxane, methyl Cellosolve, methylene chloride, ethylene dichloride, diacetone alcohol, methanol, ethanol and propanol, and mixtures thereof, from one to ten wt. percent of water based upon the organic solvent, and a plasticizer selected from the group consisting of monoacetin, diacetin, triacetin, tributyrin, triphenyl phosphate, biphenyldiphenyl phosphate, tributyl phosphate, tricresyl phosphate and glycol esters selected from the group consisting of ethylene glycol dipropionate, ethylene glycol butyrate, diethylene glycol diacetate, triethylene glycol diacetate, polyester of ethylene glycol with succinic acid, polyester of diethylene glycol with maleic acid and polyester of triethylene glycol with adipic acid, with a member selected from the group consisting of a mono-basic acid and a dibasic acid to provide a film drying the film at a temperature of from 15° C. to 45° C. and drying further at a temperature of from 80° C. to 120° C., the improvement which comprises varying the pore diameters of the fine pores in the cellulose acetate film by varying the initial drying temperature, the use of higher initial drying temperatures resulting in a corresponding decrease in pore diameter.

14. The method of claim 13 wherein said solution contains a mixture of cellulose diacetate and cellulose triacetate.

15. The method of claim 14 wherein said mixture is employed in a weight ratio of from 90:10 to 10:90.

16. The method of claim 14 wherein said mixture is employed in a weight ratio of substantially 1:1.

References Cited

UNITED STATES PATENTS

| | | | |
|---|---|---|---|
| 1,942,840 | 1/1934 | Sheppard et al. | 264—217X |
| 1,954,336 | 4/1934 | Staud et al. | 106—170X |
| 2,176,053 | 10/1939 | Billing | 106—170UX |
| 2,201,747 | 5/1940 | Staudt | 264—217 |
| 2,212,603 | 8/1940 | Hollabaugh | 160—170UX |
| 2,303,339 | 12/1942 | Dreyfus | 106—196UX |
| 2,336,310 | 12/1943 | Spence et al. | 106—196X |
| 2,337,344 | 12/1943 | Partridge | 106—170UX |
| 2,344,482 | 3/1944 | Tritsmans et al. | 264—217 |
| 2,412,611 | 12/1946 | Gloor | 106—196X |
| 2,591,077 | 4/1952 | Lamborn | 106—196 |
| 2,805,171 | 9/1957 | Williams | 106—196X |
| 2,814,570 | 11/1957 | Sloan | 106—170X |
| 2,925,352 | 2/1960 | Lowe | 106—196X |
| 2,926,104 | 2/1960 | Goetz | 264—41X |
| 3,494,780 | 2/1970 | Skiens | 264—41X |

FOREIGN PATENTS

| | | | |
|---|---|---|---|
| 468,368 | 6/1937 | Great Britain | 106—170 |

OTHER REFERENCES

U.S. Office of Saline Water, "Investigation and Preparation of Polymer Films to Improve the Separation of Water and Salts in Saline Water Conversion," Research and Development Progress Report No. 69, December 1962, pp. 5–19.

U.S. Office of Saline Water, "The Mechanism of Desalination by Reverse Osmosis," Research and Development Progress Report No. 117, August 1964, pp. 34 and 35 and Table 19.

PHILIP E. ANDERSON, Primary Examiner

U.S. Cl. X.R.

106—122, 170, 177, 189, 196, 203; 210—500; 264—331